United States Patent Office 3,117,165
Patented Jan. 7, 1964

3,117,165
SUBSTITUTED TERTIARY PHOSPHINE OXIDES
Martin Epstein, Stamford, Conn., assignor to American Cyanamid Company, Stamford, Conn., a corporation of Maine
No Drawing. Filed Apr. 26, 1962, Ser. No. 190,266
5 Claims. (Cl. 260—606.5)

The present invention relates to tertiary alpha-alkoxyphosphine oxides of the formula

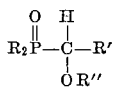

wherein R represents halo-substituted or unsubstituted alkyl ($C_1$–$C_{13}$), halo-substituted or unsubstiuted cycloalkyl, and halo-substituted or unsubstituted aryl; R' represents halo-substituted or unsubstituted aryl and R'' represents lower alkyl.

The novel products of the present invention are prepared by reacting a hydroxy-substituted tertiary phosphine of the formula

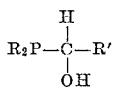

with a lower alkyl alcohol of the formula R''OH and a peroxide of the formula XOOY. R, R' and R'' in the reactant formulae just given have the same meaning given above for the product formula; X represents hydrogen, alkyl, or acyl; and Y represents hydrogen, alkyl or acyl; X and Y may represent identical moieties or different moieties. The following is a typical embodiment:

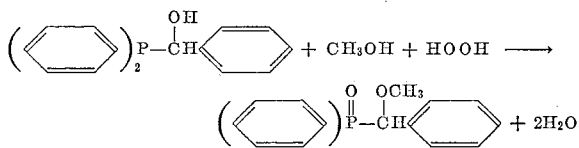

The tertiary phosphine reactants contemplated herein are prepared in a conventional manner by bringing together a secondary phosphine and an aromatic aldehyde, such as benzaldehyde. In order to prepare the tertiary phosphine reactant of the typical embodiment just given diphenylphosphine is brought into intimate contact with benzaldehyde under mildy acidic conditions, such as in the presence of a dilute mineral acid.

In the absence of a lower alkyl alcohol, treatment of the alpha-hydroxyphosphine reactants contemplated herein with peroxide oxidizing agents of the type defined above yields the corresponding tertiary phosphine oxides in lieu of the tertiary alpha-alkoxyphosphine oxides of the present invention. The following example illustrates this clearly:

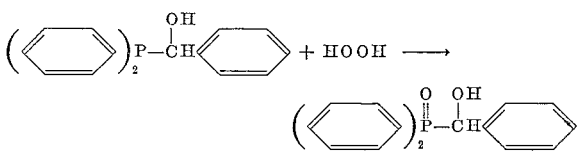

The reason the alpha-alkoxyphosphine oxide of the present invention results instead of alpha-hydroxyphosphine oxide is not understood. The surprising results of the present invention, however, provide a whole new class of compounds in a simple and straight-forward manner.

Typical hydroxy-substituted tertiary phosphine reactants within the purview of the instant discovery are the unsubstituted and halo-substituted phosphines which follow: dimethyl - alpha - hydroxybenzylphosphine, dipentyl - alpha - hydroxybenzylphosphine, didodecyl-alpha-hydroxy-1-naphthyl-methyl-phosphine, dioctadecyl-alpha-hydroxybenzylphosphine, dicyclohexyl - alpha-hydroxy-1-naphthylmethylphosphine, dicyclopentyl - alpha-hydroxy-benzylphosphine, diphenyl - alpha - hydroxybenzylphosphine, dinaphthyl - alpha - hydroxybenzylphosphine, bis-(parabromophenyl) - alpha-hydroxybenzylphosphine, bis-(2-chlorobutyl)-alpha-hydroxybenzylphosphine, diphenyl-alpha - hydroxy - 7 - bromo-1-naphthylmethylphenylphosphine, bis(meta-chlorocyclohexyl) - alpha-hydroxybenzylphosphine, ethylcyclohexyl - alpha-hydrobenzylphosphine, and the like. It follows from this list that representative inert substituents contemplated for moieties R and R' are halo-substituents, such as bromo-, chloro-, and the like.

While hydrogen peroxide and organic peroxides of the formula XOOY, defined above, are preferred reactants within the concept of the instant invention, almost any organic peroxide or organic hydroperoxide may be employed. The following are merely typical: hydrogen peroxide, tertiary-butyl-hydroperoxide, ditertiary butyl peroxide, benzoyl peroxide, lauroyl peroxide, di-acetyl peroxide, tertiary-butyl perbenzoate.

The alcohol reactants of the present invention are preferably used in excess of the stoichiometric quantity required for reaction. Thus, the lower alkanol serves as a reactant and a solvent.

The hydroxy-substituted phosphine reactant, the peroxide reactant and the lower alkanol reactant need only be present in a 1:1:1 ratio, and any practical excess of the alkanol relative to the remaining reactants may be employed satisfactorily. If desired, the peroxide may be present in excess of the hydroxy-substituted tertiary phosphine, and vice versa. It follows from this, therefore, that the ratio in which the reactants are present is not critical, as further evidenced from Table I, infra.

Generally the reaction products are recrystallized in an inert solvent, such as acetonitrile, lower alkanol, or the like, for best results. This is not absolutely necessary, however.

While best results are achieved at reflux temperatures of the lower alkanol solvent, a wide range of temperatures may be employed. For example, temperatures in the range of 0° C. to 110° C. are suitable.

The products of the present invention are useful as gasoline additives. For example, up to about 10 grams of any one of the tertiary alpha-alkoxyphosphine oxides of the present invention, when dissolved in one gallon of gasoline, affords protection against misfiring, surface ignition and the like. In addition, the novel compounds of the present invention are particularly useful as sequestering agents in the selective removal of heavy metal values from mixtures containing ions, such as nickel, cobalt, copper, iron and uranyl in the presence of alkali and alkaline earth ions. For instance, uranyl values can be selectively leached from an ore containing the same by employing techniques known in the art, as shown by Blake et al. in the Atomic Energy Commission Report ORNL-1903, May 13, 1955.

The present invention will best be understood from the following examples which are deemed illustrative and not limiting, unless, of course, limitations contained therein appear in the appended claims:

EXAMPLE I

*Diphenyl-Alpha-Methoxybenzylphosphine Oxide*

A solution of 15.7 grams of diphenylphosphine (0.084 mole), 9.0 grams of benzaldehyde (0.085 mole), 1 milliliter of concentrated HCl and 90 milliliters of methanol is placed in a 200 milliliter distilling flask, purged with nitrogen, and the resulting solution allowed to stand at 25° C. until a white solid precipitates, viz., diphenyl-alpha-hydroxybenzylphosphine. To the mixture is slowly added 9.7 grams of 30% hydrogen peroxide at a rate to reflux the resulting solution. The solvent is evaporated and the remaining residue triturated with ether to yield 23.6 grams of diphenyl-alpha-methoxybenzylphosphine oxide. The product is then recrystallized from acetonitrile.

EXAMPLE II

*Diphenyl-Alpha-Methoxy-1-Naphthylmethylphosphine Oxide*

Example I is repeated in every essential respect with the exception that naphthaldehyde is used in lieu of benzaldehyde and the corresponding product, diphenyl-alpha-methoxy-1-naphthylmethylphosphine oxide, is recovered.

EXAMPLE III

*Diphenyl-Alpha-Methoxy-Para-Chlorobenzylphosphine Oxide*

Example I is repeated in every essential respect with the exception that para-chlorobenzaldehyde is used in lieu of benzaldehyde and the corresponding product, diphenyl-alpha-methoxy-para-chlorobenzylphosphine oxide, is recovered.

EXAMPLE IV

*Diphenyl-Alpha-Ethoxybenzylphosphine Oxide*

Example I is repeated in every essential respect with the exception that ethanol is used in lieu of methanol and the corresponding product, diphenyl-alpha-ethoxybenzylphosphine oxide, is recovered.

TABLE I

| Example No. | (A) $R_2P-CHR'$ with OH | (B) $R''OH$ | (C) $XOOY$ | Temp., °C. | Ratio, A:B:C | (D) $R_2P-CHR'$ with O and OR'' |
|---|---|---|---|---|---|---|
| V | dimethyl-alpha-hydroxybenzylphosphine. | methanol | hydrogen peroxide | 65 | 1:10:1 | dimethyl-alpha-methoxybenzylphosphine oxide. |
| VI | dipentyl-alpha-hydroxybenzylphosphine. | propanol | tertiary-butyl-hydro-peroxide. | 98 | 1:7:1 | dipentyl-alpha-propoxybenzylphosphine oxide. |
| VII | didodecyl-alpha-hydroxynaphthylmethylphosphine. | butanol | ditertiary-butyl-peroxide. | 110 | 1:5:2 | didodecyl-alpha-butoxynaphthylmethylphosphine oxide. |
| VIII | dioctadecyl-alpha-hydroxybenzylphosphine. | ethanol | benzoyl peroxide | 80 | 1:10:1 | dioctadecyl-alpha-ethoxybenzylphosphine oxide. |
| IX | dicyclohexyl-alpha-hydroxynaphthylmethylphosphine. | methanol | lauroyl peroxide | 65 | 2:5:1 | dicyclohexyl-alpha-methoxynaphthylmethylphosphine oxide. |
| X | dicyclopentyl-alpha-hydroxybenzylphosphine. | do | di-acetyl peroxide | 50 | 1:15:1 | dicyclopentyl-alpha-methoxybenzylphosphine oxide. |
| XI | diphenyl-alpha-hydroxybenzylphosphine. | ethanol | tertiary-butyl-perbenzoate. | 25 | 1:10:1 | diphenyl-alpha-ethoxybenzylphosphine oxide. |
| XII | dinaphthyl-alpha-hydroxybenzylphosphine. | butanol | hydrogen peroxide | 35 | 1:12:2 | dinaphthyl-alpha-butoxybenzylphosphine oxide. |
| XIII | bis(para-bromophenyl)-alpha-hydroxybenzyl-phosphine. | ethanol | do | 90 | 1:20:1 | bis(para-bromophenyl)-alpha-ethoxybenzylphosphine oxide. |
| XIV | bis(2-chlorobutyl)-alpha-hydroxybenzylphosphine. | propanol | benzoyl peroxide | 10 | 1:9:1 | bis(2-chlorobutyl)-alpha-propoxybenzylphosphine oxide. |
| XV | bis(3-bromononyl)-alpha-hydroxybenzylphosphine. | butanol | di-acetyl peroxide | 85 | 1:10:1 | bis(3-bromononyl)-alpha-butoxybenzylphosphine oxide. |
| XVI | diphenyl-alpha-hydroxy-7-bromonaphthylmethylphosphine. | ethanol | tertiary butylhydro-peroxide. | 80 | 1:5:2 | diphenyl-alpha-ethoxy-7-bromo-1-naphthylmethylphosphine oxide. |
| XVII | bis(meta-chlorocyclohexyl)-alpha-hydroxy-benzylphosphine. | methanol | lauroyl peroxide | 75 | 1:7:1 | bis(meta-chlorocyclohexyl)-alpha-methoxybenzylphosphine oxide. |
| XVIII | ethylcyclohexyl-alpha-hydroxy-para-chloro-benzylphospine. | ethanol | benzoyl peroxide | 40 | 1:9:1 | ethylcyclohexyl-alpha-ethoxy-para-chloro-benzylphosphine oxide. |

I claim:
1. A tertiary alpha-alkoxyphosphine oxide of the formula

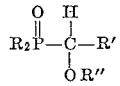

wherein R represents a member selected from the group consisting of alkyl having 1 to 18 carbon atoms, halo-substituted alkyl having 1 to 18 carbon atoms, cycloalkyl, halo-substituted cycloalkyl, aryl, halo-substituted aryl; R' represents a member selected from the group consisting of aryl and halo-substituted aryl; and R'' represents lower alkyl.

2. Diphenyl-alpha-methoxybenzylphosphine oxide.
3. Diphenyl-alpha-methoxy-1-naphthylmethylphosphine oxide.
4. Diphenyl-alpha-methoxy-para-chlorobenzylphosphine oxide.
5. Diphenyl-alpha-ethoxybenzylphosphine oxide.

No references cited.